No. 786,418. PATENTED APR. 4, 1905.
H. H. CUTLER.
METHOD OF VARYING THE SPEED OF THE LOAD DRIVEN BY AN ALTERNATING CURRENT MOTOR.
APPLICATION FILED MAY 19, 1904.

Witnesses:
Robert H. Weir
W. Perry Hahn

Inventor:
Henry H. Cutler
By Jones Addington
Attorneys

No. 786,418. PATENTED APR. 4, 1905.
H. H. CUTLER.
METHOD OF VARYING THE SPEED OF THE LOAD DRIVEN BY AN ALTERNATING CURRENT MOTOR.
APPLICATION FILED MAY 19, 1904.
6 SHEETS—SHEET 2.

Fig. 3.

Witnesses:
Robert H. Wein
W. Perry Hahn

Inventor:
Henry H. Cutler
By: Jones & Addington
Attorneys

No. 786,418. PATENTED APR. 4, 1905.
H. H. CUTLER.
METHOD OF VARYING THE SPEED OF THE LOAD DRIVEN BY AN ALTERNATING CURRENT MOTOR.
APPLICATION FILED MAY 19, 1904.

Witnesses:
Robert H. Weir
W. Perry Hahn

Inventor:
Henry H. Cutler
By Jones & Addington
Attorneys:

No. 786,418. PATENTED APR. 4, 1905.
H. H. CUTLER.
METHOD OF VARYING THE SPEED OF THE LOAD DRIVEN BY AN ALTERNATING CURRENT MOTOR.
APPLICATION FILED MAY 19, 1904.

No. 786,418. PATENTED APR. 4, 1905.
H. H. CUTLER.
METHOD OF VARYING THE SPEED OF THE LOAD DRIVEN BY AN ALTERNATING CURRENT MOTOR.
APPLICATION FILED MAY 19, 1904.
6 SHEETS—SHEET 6.

Fig. 9.

Witnesses:
Inventor.
Henry H. Cutler
By Jones Redington
Attorneys

No. 786,418. Patented April 4, 1905.

UNITED STATES PATENT OFFICE.

HENRY H. CUTLER, OF MILWAUKEE, WISCONSIN, ASSIGNOR TO THE CUTLER-HAMMER MANUFACTURING COMPANY, OF MILWAUKEE, WISCONSIN, A CORPORATION OF WISCONSIN.

METHOD OF VARYING THE SPEED OF THE LOAD DRIVEN BY AN ALTERNATING-CURRENT MOTOR.

SPECIFICATION forming part of Letters Patent No. 786,418, dated April 4, 1905.

Application filed May 19, 1904. Serial No. 208,782.

*To all whom it may concern:*

Be it known that I, HENRY H. CUTLER, a citizen of the United States, residing at Milwaukee, in the county of Milwaukee and State of Wisconsin, have invented new and useful Improvements in Methods of Varying the Speed of the Load Driven by Alternating-Current Motors, of which the following is a full, clear, concise, and exact description, reference being had to the accompanying drawings, forming a part of this specification.

My invention relates to the method of driving and varying the speed of the load driven by alternating-current motors; and it has for its object to provide a method whereby alternating-current motors may be started and the load imposed thereon without strain upon the motor or upon the power-transmission system.

In accordance with my method I employ, in connection with an alternating-current motor, a slip device which is interposed between the motor and its load, this slip device being so constructed and arranged for operation that the load may be readily connected with the motor and efficiently operated in connection therewith.

In an application filed by me August 5, 1903, Serial No. 168,388, I have described and claimed the mechanical features of a magnetic clutch or accelerator which constitutes a slip device and comprises a primary or inducing member and a secondary or induced member, one of which is adapted to be connected with the driving mechanism—in the present method with the motor—and the other with the driven mechanism, which in the present instance constitutes the load of the motor, whereby through the energization of the clutch the driven part may be caused to rotate at any desired speed, equal to or less than that of the driven part. In this slip device I utilize the effect of induction and also the effect of frictional contact between the driving and driven members to effect the acceleration of the driven member. Due to the novel construction of this slip device the energizing-current when admitted to the windings thereof does not cause the parts to be forcibly gripped or clutched together; but, on the contrary, the driven member is gradually accelerated in speed until eventually it is brought to full speed of the driving part, if desired. This gradual acceleration is accomplished principally for two reasons: first, because the clutch is so constructed that considerable inductance is developed therein, so that the energizing-current does not bring the magnetic field to full strength immediately, as is the case with the ordinary magnetic clutch, but causes the strength of the magnetic field to gradually increase, thereby exerting a gradually-increasing torque upon the driven member; second, because the combined inductional and frictional effect of the driven member upon the driving member causes the driving member to exert upon the driven member a torque, which is so proportioned as to cause a gradual acceleration.

The first effect above mentioned is accomplished by constructing the field-magnet, which constitutes the inducing member of the clutch, so that the exciting-coil will be entirely surrounded with iron, thus creating a large amount of inductance, so that when the circuit through the energizing-coil is completed the current through the energizing-coil, and consequently the strength of the magnetic field in the inducing member, will increase slowly. The sudden rising of magnetism to full strength, as in the case of ordinary magnetic clutches, resulting in extremely sudden acceleration, is entirely obviated in my clutch, due to the employment of this construction, which produces a large amount of inductance.

With respect to the second cause of gradual acceleration above mentioned it is a well-known fact that if the driven member of a clutch be forced against the driving member with a practically constant force, as is the case with the ordinary magnetic clutch, the driven member accelerates in an incredibly short space of time, producing the undesirable jerk and shock to the machinery which is incident to the employment of these magnetic clutches and which has rendered their use prohibitive except in very few and exceptional instances.

In the clutch of my invention the acceleration is due to the combined effects of friction and induction. The frictional effect is practically a constant force during the period of acceleration, while the inductional effect is a uniformly-decreasing force during the period of acceleration. The resultant force is therefore a force which gradually decreases throughout the period of acceleration. Due to the employment of a force which thus gradually decreases throughout the period of acceleration I am enabled to modify the law in accordance with which the ordinary magnetic clutch operates, in which the acceleration increases as the time, and with the clutch of my invention the acceleration increases in accordance with a different law and at a much slower rate.

By the use of a slip device of this character in my method I am also enabled to accomplish another object, which is a practically instantaneous separation of the motor from its load when the circuit through the energizing-coils of the slip device is opened. It is a well-known fact that after the energizing-current ceases in a magnetic clutch the residual magnetism of the field-magnet member will serve to attract the armature member for an appreciable period of time. It is desirable in practice that the primary member should release the secondary member at once upon the opening of the circuit through the energizing-coil, and by the use of a slip device constructed in accordance with my invention this is effectively accomplished. This result I am enabled to attain by subdividing the field-magnet of the clutch into a large number of individual circuits, which aid in causing a rapid disappearance of the residual magnetism in the secondary member of the clutch. By the subdivision of the field-magnet into a number of individual circuits the flux flowing through the armature member is caused to flow in adjacent parts in opposite directions, which meet and pass through the field member without interfering as long as the magnetizing force continues. However, as soon as this force is withdrawn the oppositely-flowing fluxes in the armature member meet in opposition to each other and neutralize each other.

In the accompanying drawings I have illustrated various devices for practicing my method, and in said drawings

Figures 1, 2:
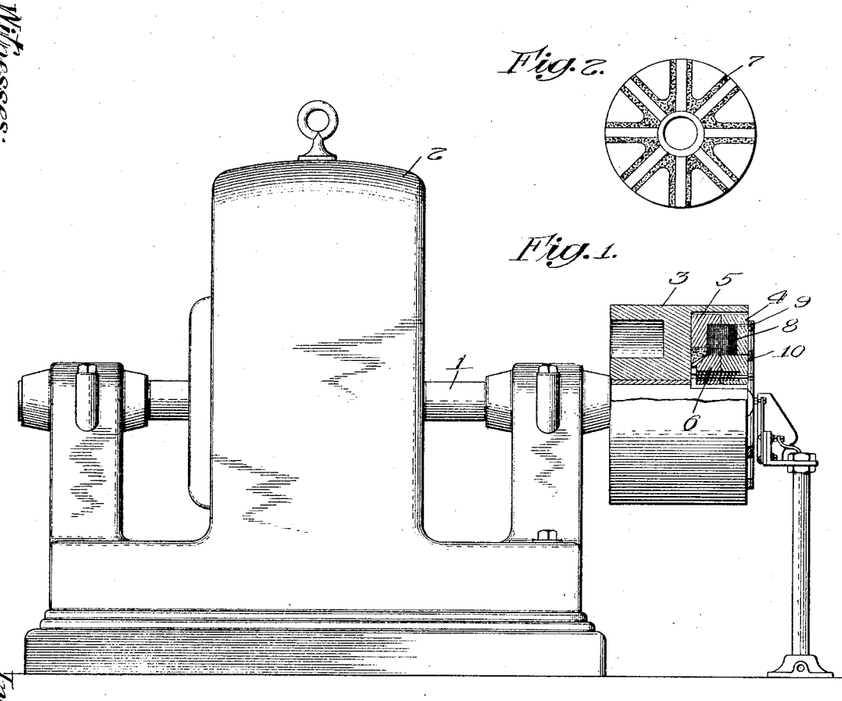
Figure 1 is a view showing an alternating-current motor with a clutch applied thereto, the regulating or governing mechanism being shown upon the right of the drawing.
Fig. 2 is a face view of the primary member of the clutch or accelerator.

One device for carrying out my method is shown in Fig. 1, in which upon the shaft 1 of the alternating-current motor 2 is connected a pulley 3, which in the present instance also constitutes the secondary or induced member of a clutch or accelerator, the primary or inducing member of which is keyed to the shaft 1. The primary or inducing member of this clutch is constructed in accordance with the invention of an application filed by me August 5, 1903, Serial No. 168,388, and consists, briefly, of a back plate 4, to which are secured a pair of rings 5 6, the ring 5 carrying inwardly-extending polar projections and the ring 6 carrying outwardly-extending polar projections, the two sets of poles being arranged in overlapping positions, as shown in Fig. 2. The spaces between the pole-pieces are filled with non-magnetic material 7, which may be Babbitt metal or other equivalent material. Inclosed within the primary member is the energizing-winding 8, which is shown of annular form. By this arrangement the exciting-coil is entirely surrounded with iron, thus creating a large amount of inductance established when the circuit through the coil is completed. The current through the energizing-coil, and consequently the strength of the magnetic field, will increase slowly, and thus prevent sudden acceleration of the driven member of the clutch. Furthermore, the arrangement of the outer and inner rings 5 and 6 provides a field-magnet which is subdivided into a large number of smaller magnetic fields, thereby causing the residual magnetism to disappear more rapidly than would be the case if a single magnetic circuit were employed. This causes the clutch to release rapidly when the current has been shut off from the energizing-windings.

The terminals of the winding 8 are connected, respectively, with the contact-rings 9 10, upon which rest suitable brushes, which serve to convey the current to the clutch-winding.

As before mentioned, the primary member of the clutch which contains the winding is keyed to the shaft 1, while the secondary member 3, which in the present instance is in the form of a pulley, is mounted loosely upon the shaft.

Figure 3:
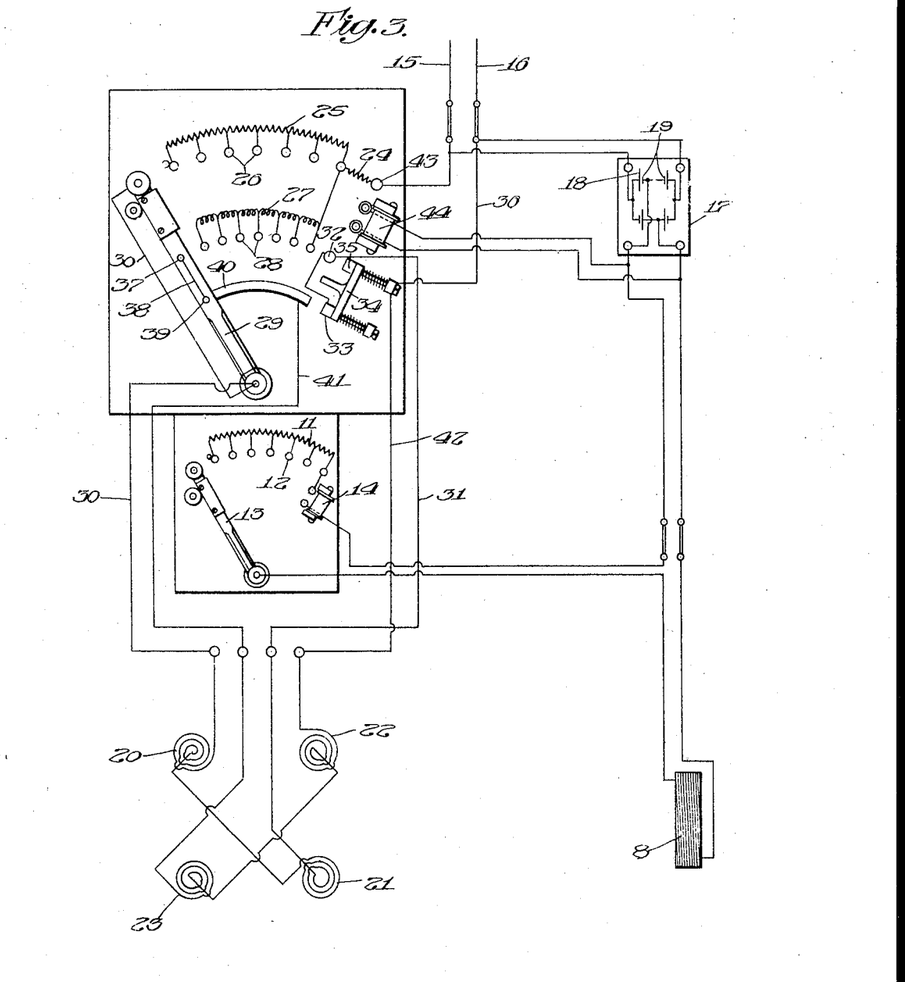
Fig. 3 is a diagram showing the current arrangement employed in connection with a single-phase motor.

In Fig. 3 the circuit for the above device for practicing my method is shown, and by this circuit it will be seen that the clutch-winding 8 is connected in circuit with a regulating resistance 11, the sections of which are connected with the contact-terminals 12 12, over which the contact-arm 13 is adapted to be moved by hand, a retaining-magnet 14 serving to normally hold the arm in the "on" position and a coiled spring, mounted at the pivot of the lever, serving to automatically return the contact-arm to the "off" position when the retaining-magnet is deënergized. The clutch-winding 8 is supplied with direct current from a suitable source, and in this instance the clutch is shown as receiving a direct current upon the alternating-current mains 15 and 16 through the interposition of a rectifier 17. This rectifier may be of any desired construction and in the present instance is diagrammatically illustrated as a rectifier of the aluminium-iron type, in which the longer transverse lines 18 represent, say, iron, while the shorter lines 19 represent the aluminium. The current from the alternating-current circuit will pass between these metals in one direction only. Accordingly with the cells disposed as illustrated a rectified current will be delivered to the secondary supply-circuit containing the clutch-winding.

In Fig. 3 I have illustrated diagrammatically the controlling apparatus which may be used with a single-phase induction-motor having, say, four field-coils. I have selected this number of coils merely for the purpose of illustration and have not illustrated the rotor or secondary member of the motor; but it will be understood that the usual secondary element of a single-phase motor is contemplated. With the supply-main 15 a resistance 24 is connected, and likewise a resistance 25, subdivided into a plurality of sections, is connected with the terminals 26 26. A second resistance 27 is also employed and is likewise subdivided into sections, which are connected with the terminals 28 28. One of these resistances—as, for instance, resistance 25—is non-inductive in character. The resistance 27 is inductive in character. The resistance 24 may be non-inductive and is for the purpose of reducing the potential supplied to the field of the motor at starting. A contact-arm 29 is provided with a contact-brush connected by conductors 30 30, through field-windings 20 and 21, thence by conductor 31, to terminals 32 and 33, thence across the bridge 34 to terminal 35, thence by conductor 36 to the opposite main 16 of the supply-circuit.

The contact-arm 29 carries a brush 37, adapted to sweep over terminals 28, this brush being connected by conductor 38 with brush 39, adapted to sweep over contact-bar 40, which bar is connected by conductor 41, through terminals 23 and 22, thence by conductor 42, to conductor 36 and main 16.

When the contact-arm 29 has been moved to the extreme position to the right, the brush on the end thereof engages terminal 43, the brush 37 engages terminal 32, and the bridge 34 is moved, by means of the contact-arm, out of engagement with the terminals 33 and 35. When the contact-arm is in its full on position, it is held by a retaining-magnet 44, which is connected across the secondary supply-circuit which supplies direct current to the clutch.

The operation of starting the motor is as follows: The parts being initially as shown in Fig. 3, the operator moves the contact-arm 29 to the right, accordingly cutting out the resistances 25 and 27. Circuit is closed from main 15, through resistance 24, resistance 25, conductor 30, field-windings 20 and 21, conductor 31, and terminals 32 and 33, bridge 34, terminal 35, conductor 36, to the opposite main 16. Circuit is closed from main 15, through resistance 24, resistance 27, brush 37, conductor 38, brush 39, contact 40, conductor 41, field-windings 23 and 22, conductors 42 and 36, to the opposite main 16. Since the resistance 25 is non-inductive, while the resistance 27 is inductive, the current passing through the resistance 27 will be retarded in phase, and accordingly the field-windings are subjected to currents of different phase to produce a rotating magnetic field, thereby starting the armature or secondary member of the motor. As the contact-arm is moved to the right to cut out resistance the armature gradually builds up in speed. While the contact-arm is moved over the series of terminals 26 and 28, the fields which are thus connected in two parallel paths are subject to practically one-half of the normal voltage of the supply-circuit, due to the interposition of the resistance 24. When the contact-arm has been moved to the extreme right—that is, the full on position—the bridge 34 is moved out of engagement with terminals 33 and 35 and the fields are thereby connected in series, the resistance 24 being at the same time removed from circuit, so that the full voltage of the supply-circuit is imposed upon the circuit containing the field-windings. This circuit may be traced from the main 15 to the terminal 43, thence by conductor 30, through field-windings 20 and 21, conductor 31, terminals 32, brush 37, conductor 38, brush 39, contact 40, conductor 41, field-windings 23 and 22, conductors 42 and 36, to the opposite main 16 of the supply-circuit. The retaining-magnet 44 serves to retain the contact-arm 29 in the full on position. The connections of an "autotransformer" may be utilized in the well-known manner for reducing the pressure on the windings at starting. The motor is thus brought to full speed without load and without undue disturbance of the pressure upon the distributing-circuit. When it is desired to impose the load on the motor, the contact-arm 13 of the clutch-controlling resistance is moved to the first terminal, and current is thus closed through the clutch-windings with all the resistance in circuit. The secondary member of the clutch is thus started from rest and is accelerated in speed as the resistance is moved from the circuit of the clutch-winding by moving the contact-arm 13 to the right. When the resistance has all been removed from the circuit, the clutch-winding is energized to the maximum extent, and the energization is sufficient to bring the driven part to full speed, which has been effected by the motor working at an effective speed with relatively high efficiency and power factor and the electrical pressure of the distributing-circuits and has not been unduly disturbed. When the contact-arm reaches the full on position, it is grasped by the retaining-magnet 14 and is held in this position during normal operation.

If for any reason the secondary supply-circuit containing the clutch-winding should become broken or if the potential for any reason should fall in value, the retaining-magnets 14 and 44 would be deënergized, and the motor would thus be brought to rest and the circuit through the clutch-winding would be opened at the controller. When it is desired to shut down the machine which the motor is driving, the clutch-winding may be deënergized by moving the contact-arm 13 to the off position. The motor continues to run at normal speed, but the clutch permits the load to be disconnected therefrom. Likewise, if it be desired to operate the driving machinery at less than normal speed the contact-arm may be moved to a position to insert resistance in series with the clutch-winding to energize the same to the desired degree, and thereby produce the desired speed of rotation of the driven member, while the motor continues to operate at its most effective speed.

Figure 4:
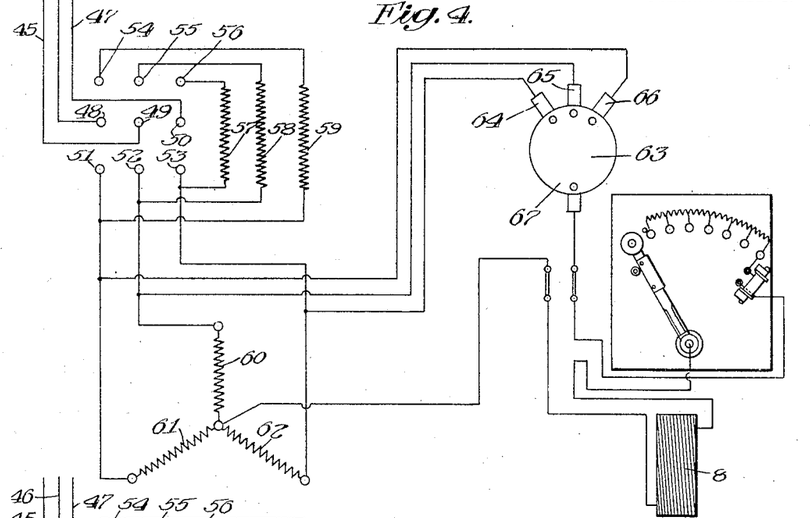
Fig. 4 shows the circuit arrangement employed in connection with a three-phase motor.

The circuit arrangement which I have illustrated in Fig. 4 shows a modification of the device designed for carrying out my method and is designed for a polyphase induction-motor, the circuit arrangement being designed for a three-phase motor. The supply-mains 45 46 47 are connected with the posts 48, 49, and 50 of a three-blade double-throw switch. When thrown in one direction, the blades engage terminals 51 52 53 and when thrown in the other direction engage terminals 54 55 56. Resistances 57, 58, and 59 are interposed between the upper set of terminals and the lower set, so that when the switch is in one position the resistances are connected in circuit, and when in the other position these resistances are removed from circuit. The field-windings 60 61 62 of the motor are connected between the terminals 51 52 53 in the usual manner, as illustrated.

In order to rectify the alternating current, I have illustrated what is known as the "Cooper Hewitt vapor-rectifier" 63, the upper terminals 64 65 66 being connected, respectively, with the terminals 53 52 51. The lower terminal 67 is connected through the controller and through the clutch-winding 8, thence to the point of junction of the field-windings.

In starting the motor the switch-blades are moved into engagement with terminals 54 55 56, respectively, and the currents of different phase which are supplied to the field-windings 60 61 62 are reduced in amount, due to the interposition of the resistances 57 58 59. As the armature of the motor rises in speed the switch-blades are thrown into engagement with the terminals 51 52 53, thus removing the resistance from circuit and permitting the armature to attain full speed. The rectifier serves to supply direct current to the clutch, and the load may be applied to the motor after the same has attained full speed, or the clutch-winding may be energized before the motor has started, as may be desired. The connections of autotransformers may be utilized instead of resistances for starting the motor, or the starting resistances (of the proper character) may be introduced in the secondary circuits of the motor through the intervention of collector-rings, and these may be controlled by the controller, as aforesaid.

Figure 5:
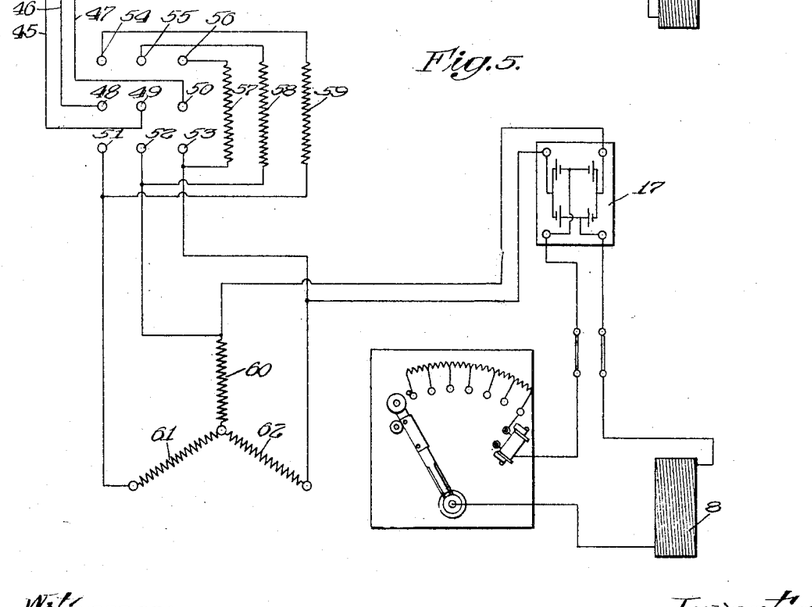
Fig. 5 shows a modification of the circuit arrangement for a three-phase motor.

Fig. 5 shows a modification of the structure shown in Fig. 4, the difference being that instead of a Cooper Hewitt rectifier an aluminium-iron rectifier 17 is employed. This rectifier derives alternating current from the terminals 52 53 and delivers direct current to the circuit of the clutch-windings and controller-magnets.

Figure 6:
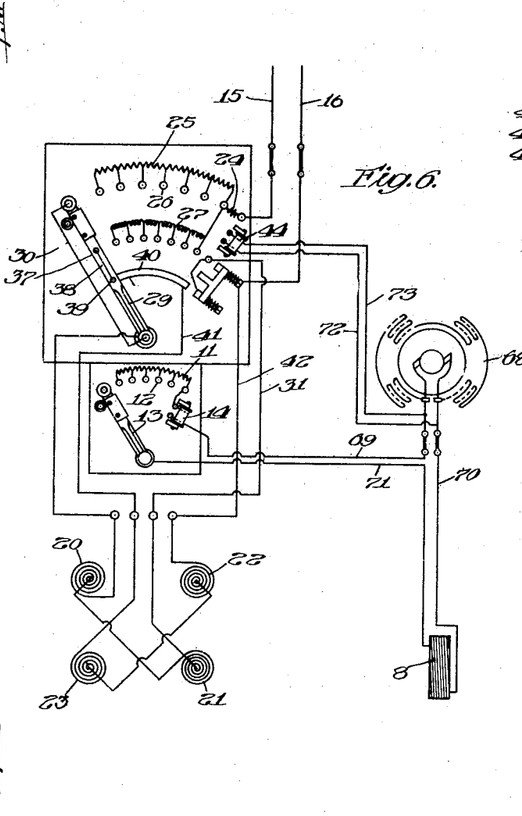
Fig. 6 is a diagrammatic view of a modification, showing separate means for supplying current to the magnetic clutch.

Fig. 6 shows another modification of the device for practicing my method. In this arrangement I use an alternating-current motor, as previously described, and a controller for the motor and clutch, also of the character previously described, and shown in Fig. 3. The clutch-winding 8, however, is supplied with direct current by an exciter 68, preferably driven by the motor. As shown, one of the terminals of the exciter is connected by the conductor 69 through the retaining-magnet 14 with the resistance 17. The opposite terminal is connected by a conductor 70 with one terminal of the clutch-winding 8, and the opposite terminal of the clutch-winding is connected by conductor 71 with the contact-arm 13. The retaining-magnet for the contact-arm of the motor-controller is supplied with direct current from the exciter 68, the terminals thereof being connected with the magnet 44 by conductors 72 and 73.

Figure 7:
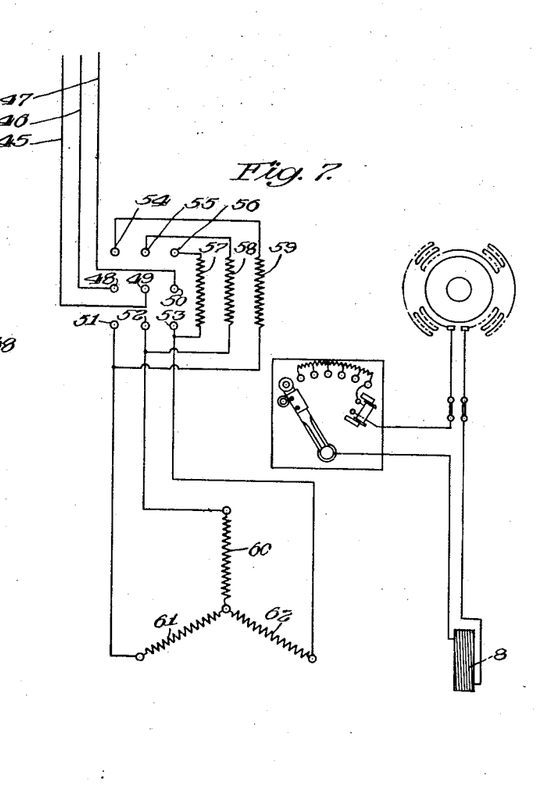
Fig. 7 is a diagrammatic view showing the circuit arrangement for a triphase motor.

In Fig. 7 I have shown a circuit arrangement for a polyphase induction-motor, the circuit arrangement being designed for a three-phase motor, as illustrated in Fig. 4, the clutch-winding, however, being supplied with direct current by an exciter, preferably driven by the motor. The retaining-magnet for the movable element of the clutch-controller is also supplied with a direct current from the exciter.

Figure 8:
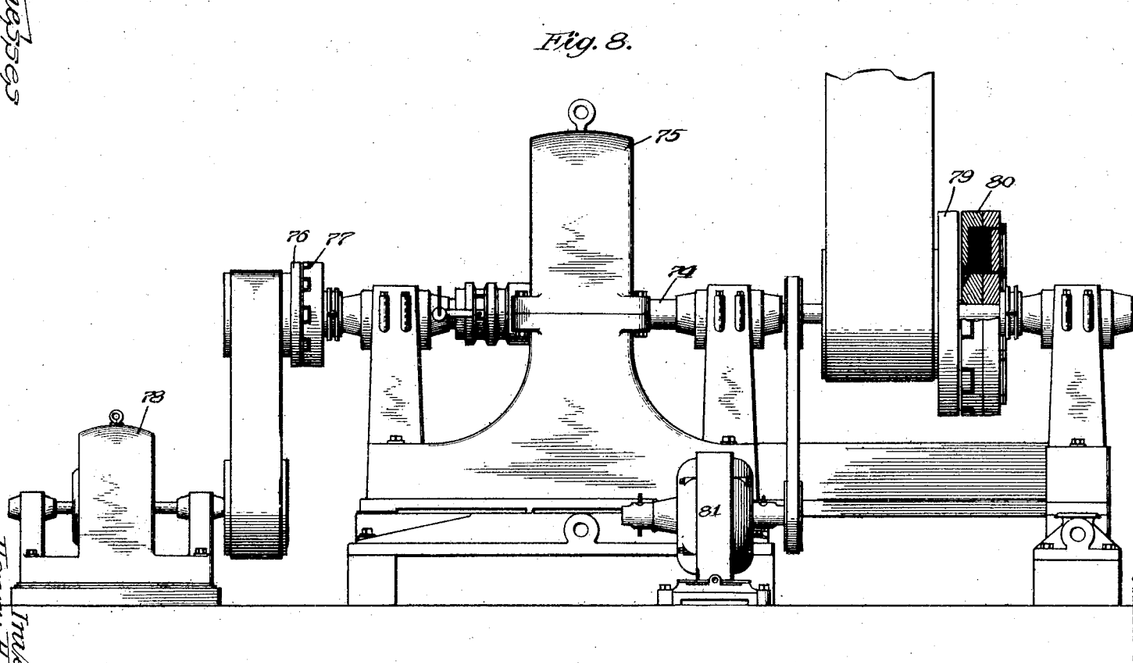
Fig. 8 is a views howing a synchronous motor with a clutch applied thereto.
Figure 9:
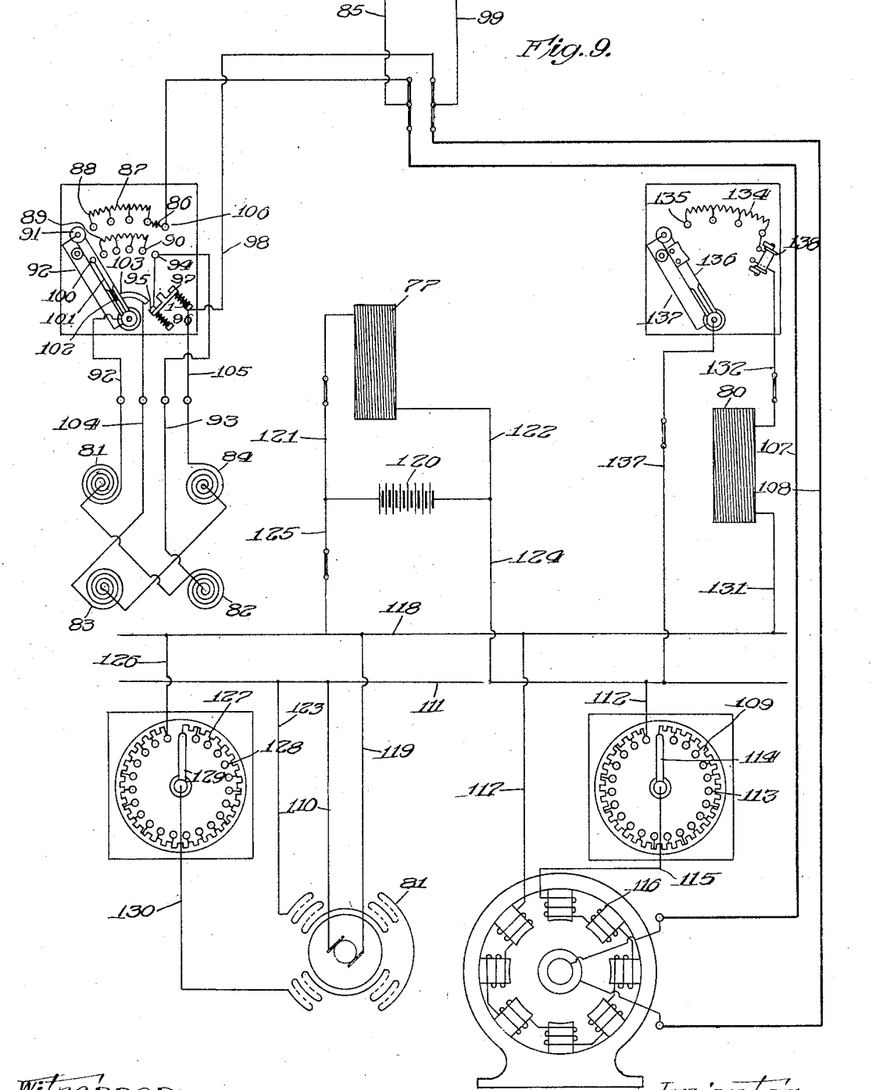
Fig. 9 is a diagrammatic view showing the circuit arrangement employed in connection with a motor of the type shown in Fig. 8.

Still another machine for carrying out my method is illustrated in Figs. 8 and 9. In these figures I have shown a synchronous alternating-current motor for driving the load, and as motors of this character are usually not self-starting I have shown a small induction-motor for starting the same which when it has attained its full speed is connected with the armature of the synchronous motor through the agency of a controllable-slip device to thereby bring the armature up to its full speed. After the armature has attained its full speed the field-circuit of the synchronous motor is connected in circuit to cause the same to operate, and the small induction-motor is cut out. In carrying out my method with this machine upon a shaft 74 of an alternating-current synchronous motor 75 a loose pulley 76 is mounted, which in the present instance constitutes the secondary or induced member of a magnetic clutch 77 of the same general character as illustrated in Figs. 1 and 2. The primary or inducing member of this clutch is keyed upon the shaft 1. A single-phase induction-motor 78 is connected by means of a belt with the pulley 76 and serves when the clutch is energized to bring the armature of the motor 75 up to speed. Upon the opposite side of the shaft 74 is mounted a loose pulley 79, constituting the secondary or induced member of a magnetic clutch 80 of the same general construction as the clutch illustrated in Figs. 1 and 2, the primary member of which is keyed to the shaft 74 and when energized operates to impose the load upon the motor 75. For supplying direct current to the clutches 77 and 80 and to the field of the synchronous motor I provide an exciter 81, belted to and driven by the shaft 74 of the motor 75.

As shown in Fig. 9, I have illustrated the starting-motor 78 as being a single-phase induction-motor having, say, four field-coils 81 82 83 84. I have selected this number of coils merely for the purpose of illustration, and I have not illustrated the rotor or secondary member of the motor; but it will be understood that the usual secondary element of a single-phase induction-motor is contemplated. With the supply-main 85 a resistance 86 is connected and likewise a resistance 87, which is subdivided into a plurality of sections connected with the terminals 88. A second resistance 89 is also employed and is likewise divided into sections, which are connected with the terminals 90. One of the resistances—as, for instance, the resistance 87—is non-inductive in character. The resistance 89 is inductive in character, and the resistance 86 may be non-inductive, it being provided for the purpose of reducing the potential supplied to the field of the motor at starting.

A contact-arm 91 is provided with a contact-brush connected by conductors 92 92 through the field-windings 81 82, thence by conductor 93 to the terminals 94 and 95, thence across bridge 96 to terminal 98, thence by conductor 98 to the opposite main 99 of the supply-circuit. The contact-arm 91 carries a brush 100, adapted to sweep over the terminals 90, this brush being connected by conductor 101 with a brush 102, adapted to sweep over the contact-bar 103, which bar is connected by conductor 104 through the windings 83 84, thence by conductor 105, by conductor 98, to main 99 of the opposite side of the supply-circuit. When the contact-arm 91 has been moved to the extreme position to the right, the brush upon the end thereof engages terminal 106 and the brush 100 engages terminal 94, and the bridge 96 is moved, by means of the contact-arm, out of engagement with the terminals 95 and 97. A synchronous motor of the usual type is employed, having its armature supplied with an alternating current and its fields with a direct current, and is shown in the accompanying drawings as having its armature connected with the conductors 107 and 108, leading from the supply-mains 85 and 99, respectively. The field is supplied with a direct current by the exciter 81. One terminal of the exciter is connected with the resistance 109 of a controller by conductors 110, 111, and 112. The controller is of the usual type, having its resistance 109 subdivided into sections connected with the terminals 113, over which a contact-arm 114 is adapted to sweep. The contact-arm is connected by conductor 115 through the fields 116 of the motor, conductors 117, 118, and 119 with the opposite terminal of the exciter 81.

The winding of the small clutch 77 is initially supplied with a direct current from a storage battery 120, connected between the conductors 121 122, leading from the opposite terminals of the clutch-winding. After the exciter has been started direct current is then supplied to the winding of the clutch 77 by the exciter 81, one terminal of the exciter being connected by the conductors 123, 111, 124, and 122 with one terminal of the clutch. The opposite terminal of the clutch is connected by conductors 121, 125, 118, and 126 with the resistance 127 of a controller. The controller is of the usual type, having its resistance subdivided into sections connected with the terminals 128, over which a contact-arm 129 is adapted to sweep. The contact-arm 129 is connected by a conductor 130 with the opposite terminal of the exciter 81. The winding of the large clutch 80 is also supplied with a direct current from the exciter 81, one terminal of the clutch being connected by conductors 131, 118, and 119 with one terminal of the exciter. The opposite terminal of the clutch-winding is connected by the conductor 132 through a small retaining-magnet 133 with a resistance 134. The resistance 134 is subdivided into sections connected with terminals 135, over which a brush carried by a contact-arm 136 is adapted to sweep. The brush is connected by conductors 137 111 110 with the opposite terminal of the exciter 81. When the contact-arm 136 is in its full on position, it is held against being returned to its initial or off position under the action of a spring arranged at its pivot by the retaining-magnet 133.

The operation of starting the motor would be as follows: The parts being initially as shown in Fig. 9, the operator moves the contact-arm 91 to the right, accordingly cutting out the resistances 87 and 89. Circuit is closed from the main 85 through the resistance 86, resistance 87. conductor 92, field-windings 81 82, conductor 93, terminals 94 95, across the bridge 96, to terminal 97, and thence by conductor 98 to the opposite main 99. Circuit is closed from the main 85, through the resistance 86, resistance 89, brush 100, conductor 101, brush 102, contact-bar 103, conductor 104, fields 83 84, conductor 105, and conductor 98 to the opposite main 99. Since the resistance 87 is non-inductive, while the resistance 89 is inductive, the current passing through the resistance 89 will be retarded in phase, and accordingly the field-windings are subjected to currents of different phase, which produce a rotating magnetic field, thereby starting the armature or secondary member of the motor. As the contact-arm is moved to the right to cut out the resistance the armature gradually builds up in speed. The fields which are thus connected in two parallel paths are subject to practically one-half of the normal voltage, due to the interposition of the resistance 86. When the contact-arm has been moved to the extreme right—that is, to the full on position—the bridge 96 is moved out of engagement with the terminals 95 and 97. The fields are thus connected in series, the resistance 86 being at the same time removed from circuit, so that the full voltage of the supply-current is imposed upon the circuit containing the field-windings. This circuit may be traced from the main 85 to the terminal 106, thence by conductor 92, through field-windings 83 84, conductor 93, to terminal 94, brush 100, conductor 101, brush 102, contact-arm 103, conductor 104, field-windings 83 84, conductors 105 and 98, to the opposite main 99 of the supply-circuit. The motor having attained full speed, the clutch 77 is energized and the armature of the motor 75 is brought up to speed, the current from the storage battery 120 passing by conductor 121 through the clutch-winding and thence by conductor 53 to the opposite side of the battery. The direct-current exciter 81 is then switched into the field-circuit of the motor 75, the circuit being traced from one terminal of the exciter through the conductors 110 111 112, through resistance 109, the contact-arm 114, through conductor 115, through the fields 116 and through the conductors 117 118 119 to the opposite side of the exciter 81. The armature of the motor 75 is then connected in circuit, circuit passing from the main 85, through the conductor 197, through the armature, thence by conductor 108 to the opposite main 99 of the supply-circuit. The field and the armature being thus excited, the motor 75 operates as a synchronous single-phase motor. The induction-motor may now be removed from circuit and the clutch 77 deënergized, thereby disconnecting the induction-motor from the motor 75.

When it is desired to impose the load upon the motor, the operator moves the contact-arm 136 to the right, accordingly cutting out the resistance 134. Circuit is closed from one terminal of the exciter 81 through the conductors 110 111 137, through the resistance 134, through the magnet 133, conductor 132, through the winding of the clutch 80, from thence through the conductors 131, 118, and 119 to the opposite terminal of the exciter. By means of the resistance 134 the driven member of the clutch may be started from rest and gradually accelerated in speed, as the resistance is removed from the clutch-winding by moving the contact-arm 136 to the right. When the resistance has all been removed from circuit, the clutch-winding is energized to the maximum extent, and the energization is sufficient to bring the driven part to full speed, and this is effected with the motor working at an effective speed with relatively high efficiency and power factor, and the electrical pressure of the distributing-circuits has not been unduly disturbed. When the contact-arm reaches the full on position, it is grasped by the retaining-magnet 133 and held in this position during normal operation.

My method of operation makes it possible to start a large load and vary the speed thereof in connection with an alternating-current motor while the motor is operated at its effective speed and is therefore capable of doing its work at a relatively efficient and high power factor, so that the losses in the motor are reduced and the electrical pressure of the distributing-lines need not be disturbed in the undue manner heretofore a feature of starting and varying the speed of loads driven by alternating-current motors. By the interposition of a controllable slip device between the motor and its load I am thus enabled by the present invention to obviate the above-mentioned objections heretofore encountered in the operation of alternating-current motors.

It will be noted that by means of the present invention I have devised a radically new method of starting alternating-current motors, which consists in starting the rotor of the motor in the usual manner without load, introducing a controllable slip between the rotor and load, (this controllable slip taking place between two suitable polar surfaces, one of which moves with the rotor of the motor and the other with the load,) subjecting the controllable slip-surfaces to inductive action to accelerate the load, this inductive effect being controllable, whereby the load may be accelerated at any desired rate, and, finally, if it be desired to bring the load to the full speed of the rotor of the motor, superimposing upon the inductive effect the frictional effect of the driving controllable slip-surface upon the driven controllable slip-surface.

Having described my invention, what I claim as new, and desire to secure by Letters Patent, is—

1. The method of varying the speed of the load driven by an alternating-current motor which consists in producing a controllable, joint inductive and frictional slip between the rotor of said motor and its load and supplying direct current for energizing the controllable slip device.

2. The method of starting the load of an alternating-current motor which consists in establishing a controllable slip between the rotating part of the motor and its load, the said slip being jointly inductive and frictional, and increasing the frictional torque after the load has been accelerated to a point near full speed, thereby bringing the load to full speed.

3. The method of improving the power factor at starting a loaded alternating-current motor which consists in establishing a controllable slip between the rotating part of the motor and the load, bringing the rotating part to full speed, and accelerating the load by inductive influence between the surfaces between which said controllable slip takes place.

4. The method of improving the power factor and efficiency at starting a loaded alternating-current motor, which consists in establishing a controllable slip between the rotating part of the motor and the load, bringing the rotating part to full speed, and accelerating the load by the joint influence of induction and friction between the surfaces between which said controllable slip takes place.

5. The method of improving the power factor at starting a loaded alternating-current motor, which consists in establishing a controllable slip between two surfaces, one of which moves with the rotor of the motor, and the other with the load, bringing the rotor to full speed, accelerating the load by inductive influence between said controllable slip, surfaces and also subjecting said surfaces to frictional action, thereby superimposing a frictional torque upon the torque due to said induction for the purpose of bringing the load to full speed.

6. The method of accelerating the speed of the load driven by an alternating-current motor, which consists in producing between the rotor of said motor and its load a gradually-decreasing slip, said decrease being due to a graduated torque impressed upon the driven part, which is jointly produced by electromagnetic induction and friction.

7. The method of accelerating the speed of the load driven by an alternating-current, which consists in producing between said motor and its load a gradually-decreasing slip, the decrease in said slip being due to an automatically-graduated torque impressed upon the driven part, which is jointly produced by electromagnetic induction and friction.

8. The method of accelerating the speed of the load driven by an alternating-current motor, which consists in producing between the rotor of said motor and the load a gradually-decreasing slip, the decrease in said slip being due to a graduated torque impressed upon the driven part, said torque being jointly produced by electromagnetic induction and friction, the electromagnetic effect thereof first preponderating but being gradually replaced by the frictional effect.

9. The method of accelerating the speed of the load driven by an alternating-current motor, which consists in producing between the rotor of said motor and its load a gradually-decreasing slip, the decrease in said slip being due to an automatically-graduated torque impressed upon the driven part by the driving part, said torque being jointly produced by electromagnetic induction and friction, the electromagnetic effect at first preponderating but being gradually replaced by the frictional effect.

10. The method of varying the speed of a load driven by an alternating-current motor, which consists in producing a controllable joint inductive and frictional slip between the rotor of said motor and its load and transforming the dynamic power of the motor into a direct current for energizing the controllable slip device.

11. The method of varying the speed of a load driven by an alternating-current motor, which consists in producing a controllable joint inductive and frictional slip between the rotor of said motor and its load, and transforming the alternating current for said motor to a direct current for energizing the controllable slip device.

12. The method of varying the speed of the load driven by an alternating-current motor, which consists in producing a joint inductive and frictional slip between the rotor of the motor and its load, and transforming the electrical energy of an alternating current to a direct current to energize the controllable slip device.

13. The method of varying the speed of the load driven by an alternating-current motor, which consists in producing a controllable joint inductive and frictional slip between the rotor of the said motor and its load, and transforming an alternating current to a direct current without any intervening dynamic step.

14. The method of varying the speed of the load driven by an alternating-current motor, which consists in producing a controllable joint inductive and frictional slip between the rotor of said motor and its load and transforming the alternating current into a direct current for energizing the controllable slip device without an intervening moving factor.

15. The method of starting an alternating-current motor and imposing load thereon which consists in connecting the field-windings of the motor in two parallel paths, introducing in said paths adjustable resistance of such character as to supply said field-windings with currents of different phase, reducing the voltage of the current supplied to said field-windings when connected in parallel and producing a controllable slip between said motor and its load.

16. The method of starting an alternating-current motor and imposing the load thereon, which consists in connecting the field-windings of said motor in two parallel paths, introducing an adjustable resistance in each path of such character as to supply the field-windings with current of different phase, reducing the voltage of the current supplied to the field-windings when connected in parallel, removing all resistance from the circuit of the field-windings and connecting the same in series and producing a controllable slip between said motor and its load.

17. The method of starting a synchronous alternating-current motor and imposing the load thereon, which consists in producing a controllable joint inductive and frictional slip between the armature-starting device and the armature and producing a controllable slip between said motor and its load.

18. The method of starting a synchronous alternating-current motor and imposing the load thereon, which consists in producing a controllable joint inductive and frictional slip between the armature-starting device and the armature and when the armature has attained speed, supplying the armature with an alternating current and the fields with a direct current and producing a controllable slip between said motor and its load.

19. The method of starting a synchronous alternating-current motor and imposing the load thereon, which consists in producing a controllable joint inductive and frictional slip between the armature-starting device and armature and between the armature of the motor and the load.

In witness whereof I have hereunto subscribed my name in the presence of two witnesses.

HENRY H. CUTLER.

Witnesses:
M. PERRY HALUS,
W. R. ROCHFORD.